United States Patent
Lubbers et al.

(10) Patent No.: US 7,406,621 B2
(45) Date of Patent: Jul. 29, 2008

(54) DUAL REDUNDANT DATA STORAGE FORMAT AND METHOD

(75) Inventors: Clark Edward Lubbers, Colorado Springs, CO (US); David Peter DeCenzo, Pueblo, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 356 days.

(21) Appl. No.: 11/095,322

(22) Filed: Mar. 31, 2005

(65) Prior Publication Data

US 2005/0229023 A1 Oct. 13, 2005

Related U.S. Application Data

(60) Provisional application No. 60/559,395, filed on Apr. 2, 2004.

(51) Int. Cl.
*G06F 11/00* (2006.01)
(52) U.S. Cl. .......................... 714/6; 711/114
(58) Field of Classification Search ................ None
See application file for complete search history.

(56) References Cited

U.S. PATENT DOCUMENTS

| | | | |
|---|---|---|---|
| 6,101,615 A * | 8/2000 | Lyons | 714/6 |
| 6,353,895 B1 | 3/2002 | Stephenson | |
| 6,453,428 B1 | 9/2002 | Stephenson | |
| 6,557,123 B1 | 4/2003 | Wiencko, Jr. et al. | |
| 6,785,836 B2 * | 8/2004 | Franklin et al. | 714/6 |
| 6,848,022 B2 | 1/2005 | Nanda | |
| 6,851,082 B1 * | 2/2005 | Corbett | 714/770 |
| 7,093,159 B1 * | 8/2006 | Nanda | 714/6 |
| 7,149,847 B2 * | 12/2006 | Frey et al. | 711/114 |
| 7,200,715 B2 * | 4/2007 | Kleiman et al. | 711/114 |
| 7,237,062 B2 * | 6/2007 | Lubbers et al. | 711/114 |
| 7,263,582 B2 * | 8/2007 | Vasudevan et al. | 711/114 |
| 2004/0250161 A1 * | 12/2004 | Patterson | 714/6 |
| 2005/0166083 A1 * | 7/2005 | Frey et al. | 714/6 |
| 2008/0005612 A1 * | 1/2008 | Arai | 714/6 |

OTHER PUBLICATIONS

Charles M. Kozierok, "Raid Level 6," The PC Guide, 2.2.0 ed., http://www.PCGuide.com, pp. 1-3, (Apr. 17, 2001).

* cited by examiner

*Primary Examiner*—Christopher S McCarthy
(74) *Attorney, Agent, or Firm*—Fellers, Snider, et al.

(57) ABSTRACT

Disclosed is a data storage architecture that provides data regeneration following the failure of two storage domains and that provides conversion for RAID-6 to RAID-5 or RAID-0 without moving or copying any data. A storage grid comprising at least eight domains and twelve rows contains user data in a first contiguous portion and may contain row parity data in a second continuous portion and may contain vertical parity data in a third contiguous portion. In one embodiment data is arranged in row and vertical sets each comprising four data blocks such that each user data block is a member of one row set and is a member of one vertical set. In another embodiment sets comprise two blocks each.

16 Claims, 11 Drawing Sheets

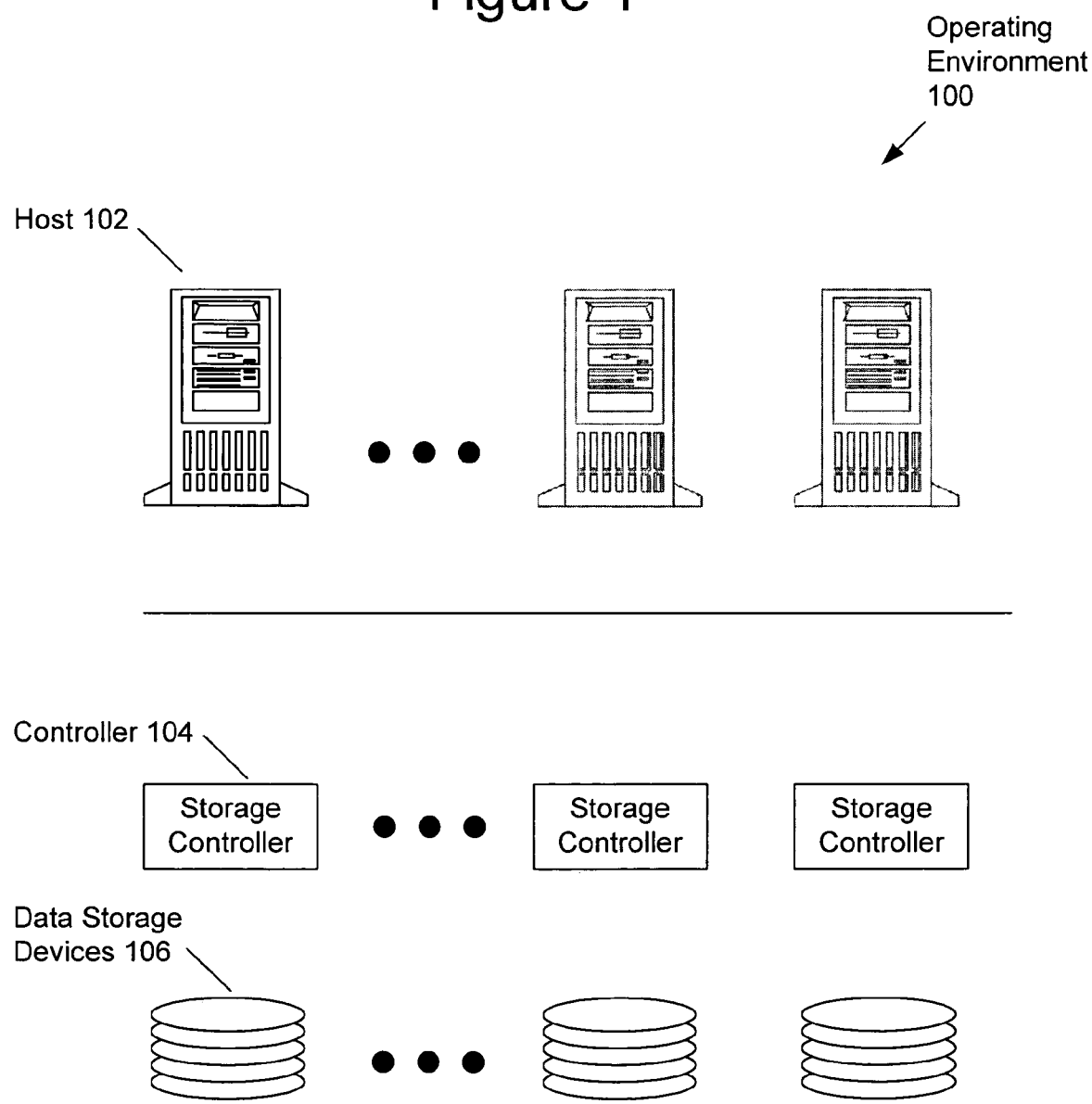

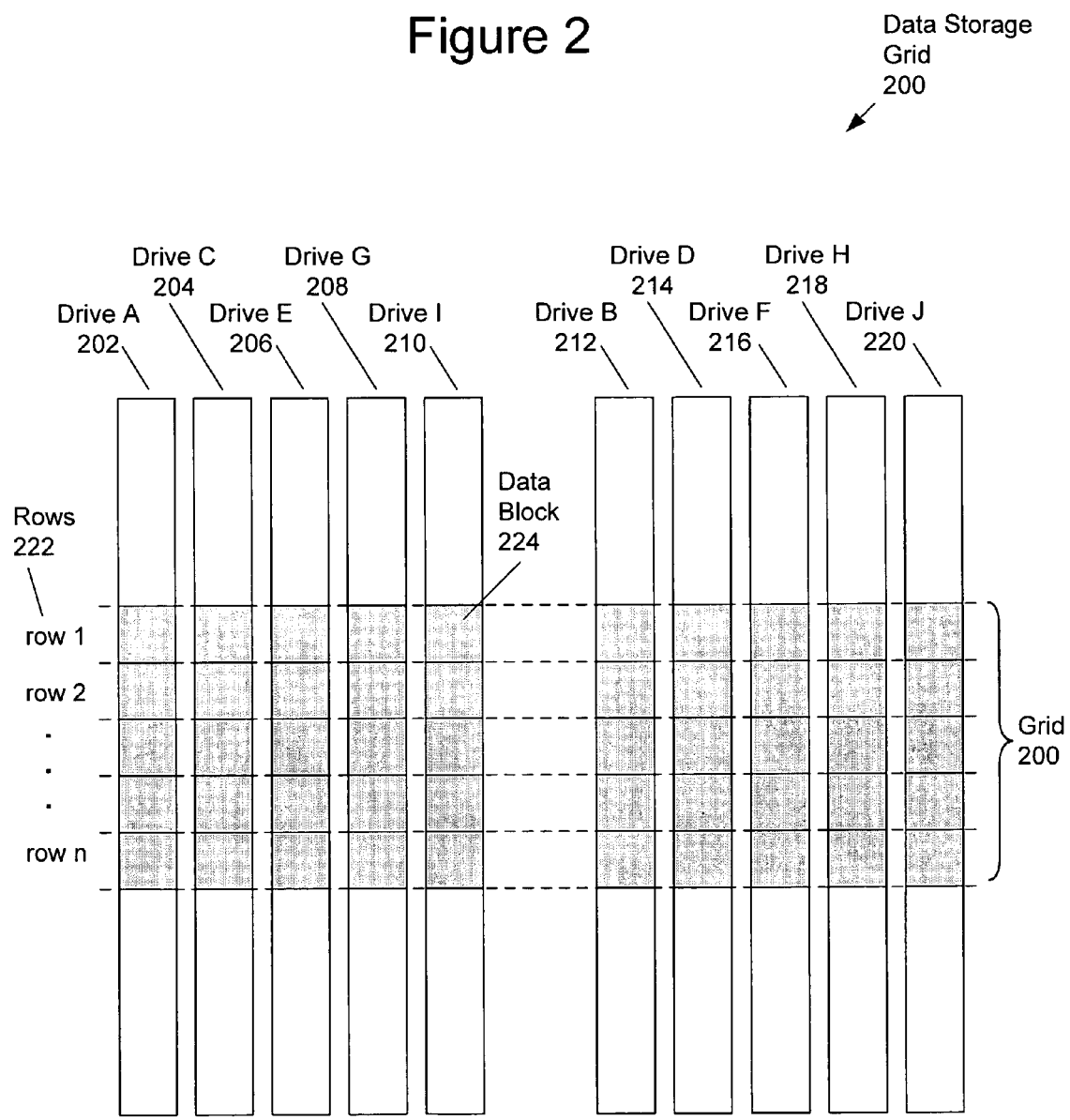

Figure 3

RAID 6 Grid Utilization Map 300

Domains 302

| Data A | Data A | Data A | Data A | Data B | Data B | Data B | Data B |
|---|---|---|---|---|---|---|---|
| Data C | Data C | Data C | Data C | Data D | Data D | Data D | Data D |
| Data E | Data E | Data E | Data E | Data F | Data F | Data F | Data F |
| Data G | Data G | Data G | Data G | Data H | Data H | Data H | Data H |
| Data I | Data I | Data I | Data I | Data J | Data J | Data J | Data J |
| Data K | Data K | Data K | Data K | Data L | Data L | Data L | Data L |
| Data M | Data M | Data M | Data M | Data N | Data N | Data N | Data N |
| Data O | Data O | Data O | Data O | Data P | Data P | Data P | Data P |
| Parity | | | | Parity | | | |
| Parity | | | | Parity | | | |

Rows 304

Group 1 306    Group 2 308

Figure 4

RAID 6 Data / Parity Map 400

| | | | | | | | | |
|---|---|---|---|---|---|---|---|---|
| A-1 | A-2 | A-3 | A-4 | E-5 | E-6 | E-7 | E-8 | |
| B-8 | B-1 | B-2 | B-3 | F-4 | F-5 | F-6 | F-7 | |
| C-7 | C-8 | C-1 | C-2 | G-3 | G-4 | G-5 | G-6 | |
| D-6 | D-7 | D-8 | D-1 | H-2 | H-3 | H-4 | H-5 | Data 1 |
| I-10 | I-9 | I-12 | I-11 | M-14 | M-13 | M-16 | M-15 | |
| J-9 | J-16 | J-11 | J-10 | N-13 | N-12 | N-15 | N-14 | |
| K-16 | K-15 | K-10 | K-9 | O-12 | O-11 | O-14 | O-13 | |
| L-15 | L-14 | L-9 | L-16 | P-11 | P-10 | P-13 | P-12 | |
| 13P | 5P | 15P | 7P | 9P | 1P | 11P | 3P | Vertical Parity (VPAR-1) |
| 14P | 6P | 16P | 8P | 10P | 2P | 12P | 4P | |
| EP | MP | FP | NP | AP | IP | BP | JP | Row Parity (RPAR-1) |
| GP | OP | HP | PP | CP | KP | DP | LP | |

Data Rows 402 (rows 1–8)
Parity Rows 404 (rows 9–12)
Grid Contents 406

Figure 6

RAID 6 Reconstruction Example 600

| Steps 602 | Regenerated Blocks 604 | | Calculations 606 | | | | | | | |
|---|---|---|---|---|---|---|---|---|---|---|
| 1 | A-2 | = | B-2 | XOR | C-2 | XOR | H-2 | XOR | 2P | |
|  | I-10 | = | J-10 | XOR | K-10 | XOR | P-10 | XOR | 10P | |
|  | 13P | = | M-13 | XOR | N-13 | XOR | O-13 | XOR | P-13 | |
|  | 5P | = | E-5 | XOR | F-5 | XOR | G-5 | XOR | H-5 | |
|  | EP | = | E-5 | XOR | E-6 | XOR | E-7 | XOR | E-8 | |
|  | MP | = | M-14 | XOR | M-13 | XOR | M-16 | XOR | M-15 | |
|  | GP | = | G-3 | XOR | G-4 | XOR | G-5 | XOR | G-6 | |
|  | OP | = | O-12 | XOR | O-11 | XOR | O-14 | XOR | O-13 | |
| 2 | A-1 | = | A-2 | XOR | A-3 | XOR | A-4 | XOR | AP | |
|  | I-9 | = | I-10 | XOR | I-12 | XOR | I-11 | XOR | IP | |
| 3 | B-1 | = | A-1 | XOR | C-1 | XOR | D-1 | XOR | 1P | |
|  | J-9 | = | I-9 | XOR | K-9 | XOR | L-9 | XOR | 9P | |
| 4 | B-8 | = | B-1 | XOR | B-2 | XOR | B-3 | XOR | 2P | |
|  | J-16 | = | J-9 | XOR | J-13 | XOR | J-10 | XOR | JP | |
| 5 | C-8 | = | B-8 | XOR | D-8 | XOR | E-8 | XOR | 8P | |
|  | K-16 | = | J-16 | XOR | M-16 | XOR | L-16 | XOR | 15P | |
| 6 | C-7 | = | C-8 | XOR | C-1 | XOR | C-2 | XOR | CP | |
|  | K-15 | = | K-16 | XOR | K-10 | XOR | K-9 | XOR | KP | |
| 7 | D-7 | = | C-7 | XOR | E-7 | XOR | F-7 | XOR | 7P | |
|  | L-15 | = | K-15 | XOR | M-15 | XOR | N-15 | XOR | 15P | |
| 8 | D-6 | = | D-7 | XOR | D-8 | XOR | D-1 | XOR | DP | |
|  | L-14 | = | L-15 | XOR | L-9 | XOR | L-16 | XOR | LP | |
| 9 | 6P | = | D-5 | XOR | E-6 | XOR | F-6 | XOR | G-6 | |
|  | 14P | = | L-14 | XOR | M-14 | XOR | N-14 | XOR | O-14 | |

Figure 7

Regeneration Chart 700

Data/Parity 702

| | |
|---|---|
| A-1 | A-2 |
| B-8 | B-1 |
| C-7 | C-8 |
| D-6 | D-7 |
| I-10 | I-9 |
| J-9 | J-16 |
| K-16 | K-15 |
| L-15 | L-14 |
| 13P | 5P |
| 14P | 6P |
| EP | MP |
| GP | OP |

Row Indices 704 / Row Instances 706

| Row | Instances |
|---|---|
| A | 2 |
| B | 2 |
| C | 2 |
| D | 2 |
| E | 1 |
| F | 0 |
| G | 1 |
| H | 0 |
| I | 2 |
| J | 2 |
| K | 2 |
| L | 2 |
| M | 1 |
| N | 0 |
| O | 1 |
| P | 0 |

Vertical Indices 708 / Vertical Instances 710

| Diag | Instances |
|---|---|
| 1 | 2 |
| 2 | 1 |
| 3 | 0 |
| 4 | 0 |
| 5 | 1 |
| 6 | 2 |
| 7 | 0 |
| 8 | 2 |
| 9 | 2 |
| 10 | 1 |
| 11 | 0 |
| 12 | 0 |
| 13 | 1 |
| 14 | 2 |
| 15 | 2 |
| 16 | 2 |

Figure 8

Regeneration Chart 800

Row Indices 802 — Regeneration Steps 806

| Row | 0 | 1 | 2 | 3 | 4 | 5 | 6 | 7 | 8 | 9 |
|---|---|---|---|---|---|---|---|---|---|---|
| A | 2 | 1 | 0 | 0 | 0 | 0 | 0 | 0 | 0 | 0 |
| B | 2 | 2 | 2 | 1 | 0 | 0 | 0 | 0 | 0 | 0 |
| C | 2 | 2 | 2 | 2 | 2 | 1 | 0 | 0 | 0 | 0 |
| D | 2 | 2 | 2 | 2 | 2 | 2 | 2 | 1 | 0 | 0 |
| E | 1 | 0 | 0 | 0 | 0 | 0 | 0 | 0 | 0 | 0 |
| F | 0 | 0 | 0 | 0 | 0 | 0 | 0 | 0 | 0 | 0 |
| G | 1 | 0 | 0 | 0 | 0 | 0 | 0 | 0 | 0 | 0 |
| H | 0 | 0 | 0 | 0 | 0 | 0 | 0 | 0 | 0 | 0 |
| I | 2 | 1 | 0 | 0 | 0 | 0 | 0 | 0 | 0 | 0 |
| J | 2 | 2 | 2 | 1 | 0 | 0 | 0 | 0 | 0 | 0 |
| K | 2 | 2 | 2 | 2 | 2 | 1 | 0 | 0 | 0 | 0 |
| L | 2 | 2 | 2 | 2 | 2 | 2 | 2 | 1 | 0 | 0 |
| M | 1 | 0 | 0 | 0 | 0 | 0 | 0 | 0 | 0 | 0 |
| N | 0 | 0 | 0 | 0 | 0 | 0 | 0 | 0 | 0 | 0 |
| O | 1 | 0 | 0 | 0 | 0 | 0 | 0 | 0 | 0 | 0 |
| P | 0 | 0 | 0 | 0 | 0 | 0 | 0 | 0 | 0 | 0 |

808 Row Index Instances

Vertical Indices 804 — Regeneration Steps 806

| Vertical | 0 | 1 | 2 | 3 | 4 | 5 | 6 | 7 | 8 | 9 |
|---|---|---|---|---|---|---|---|---|---|---|
| 1 | 2 | 2 | 1 | 0 | 0 | 0 | 0 | 0 | 0 | 0 |
| 2 | 1 | 0 | 0 | 0 | 0 | 0 | 0 | 0 | 0 | 0 |
| 3 | 0 | 0 | 0 | 0 | 0 | 0 | 0 | 0 | 0 | 0 |
| 4 | 0 | 0 | 0 | 0 | 0 | 0 | 0 | 0 | 0 | 0 |
| 5 | 1 | 0 | 0 | 0 | 0 | 0 | 0 | 0 | 0 | 0 |
| 6 | 2 | 2 | 2 | 2 | 2 | 2 | 2 | 2 | 1 | 0 |
| 7 | 2 | 2 | 2 | 2 | 2 | 2 | 1 | 0 | 0 | 0 |
| 8 | 2 | 2 | 2 | 2 | 1 | 0 | 0 | 0 | 0 | 0 |
| 9 | 2 | 2 | 1 | 0 | 0 | 0 | 0 | 0 | 0 | 0 |
| 10 | 1 | 0 | 0 | 0 | 0 | 0 | 0 | 0 | 0 | 0 |
| 11 | 0 | 0 | 0 | 0 | 0 | 0 | 0 | 0 | 0 | 0 |
| 12 | 0 | 0 | 0 | 0 | 0 | 0 | 0 | 0 | 0 | 0 |
| 13 | 1 | 0 | 0 | 0 | 0 | 0 | 0 | 0 | 0 | 0 |
| 14 | 2 | 2 | 2 | 2 | 2 | 2 | 2 | 2 | 1 | 0 |
| 15 | 2 | 2 | 2 | 2 | 2 | 2 | 1 | 0 | 0 | 0 |
| 16 | 2 | 2 | 2 | 2 | 1 | 0 | 0 | 0 | 0 | 0 |

810 Vertical Index Instances

Steps for Regenerating RAID-6 Blocks 900

Figure 10

Utilization Chart 1000

| RAID-0 1002 | RAID-1-2 1004 | RAID-1-3 1006 | RAID-5 1008 | RAID-6 1010 |
|---|---|---|---|---|
| Data 1 | Data 1 | Data 1 | Data 1 | Data 1 |
| Data 2 | Data 2 | Data 2 | Data 2 | Data 2 |
| Data 3 | Data 3 | Data 3 | Data 3 | Data 3 |
| Data 4 | Data 4 | Data 4 | Data 4 | Data 4 |
| Data 5 | Data 5 | Data 5 | Data 5 | Data 5 |
| Data 6 | Data 6 | Data 6 | Data 6 | Data 6 |
| Data 7 | Data 7 | Data 7 | Data 7 | Data 7 |
| Data 8 | Data 8 | Data 8 | Data 8 | Data 8 |
| Data 9 | Data 9 | Data 9 | Data 9 | Data 9 |
| Data 10 | Data 10 | Data 10 | Data 10 | Data 10 |
| Data 11 | Data 11 | MData 10 | Data 11 | Data 11 |
| Data 12 | Data 12 | MData 9 | Data 12 | Data 12 |
| Data 13 | Data 13 | MData 8 | Data 13 | Data 13 |
| Data 14 | Data 14 | MData 7 | Data 14 | Data 14 |
| Data 15 | Data 15 | MData 6 | Data 15 | Data 15 |
| Data 16 | MData 15 | MData 5 | Data 16 | Data 16 |
| Data 17 | MData 14 | MData 4 | Data 17 | Data 17 |
| Data 18 | MData 13 | MData 3 | Data 18 | Data 18 |
| Data 19 | MData 12 | MData 2 | Data 19 | Data 19 |
| Data 20 | MData 11 | MData 1 | Data 20 | Data 20 |
| Data 21 | MData 10 | MData 10' | Data 21 | VP 17-20 |
| Data 22 | MData 9 | MData 9' | Data 22 | VP 13-16 |
| Data 23 | MData 8 | MData 8' | Data 23 | VP 9-12 |
| Data 24 | MData 7 | MData 7' | Data 24 | VP 5-8 |
| Data 25 | MData 6 | MData 6' | RP 21-24 | VP 1-4 |
| Data 26 | MData 5 | MData 5' | RP 17-20 | RP 17-20 |
| Data 27 | MData 4 | MData 4' | RP 13-16 | RP 13-16 |
| Data 28 | MData 3 | MData 3' | RP 9-12 | RP 9-12 |
| Data 29 | MData 2 | MData 2' | RP 5-8 | RP 5-8 |
| Data 30 | MData 1 | MData 1' | RP 1-4 | RP 1-4 |

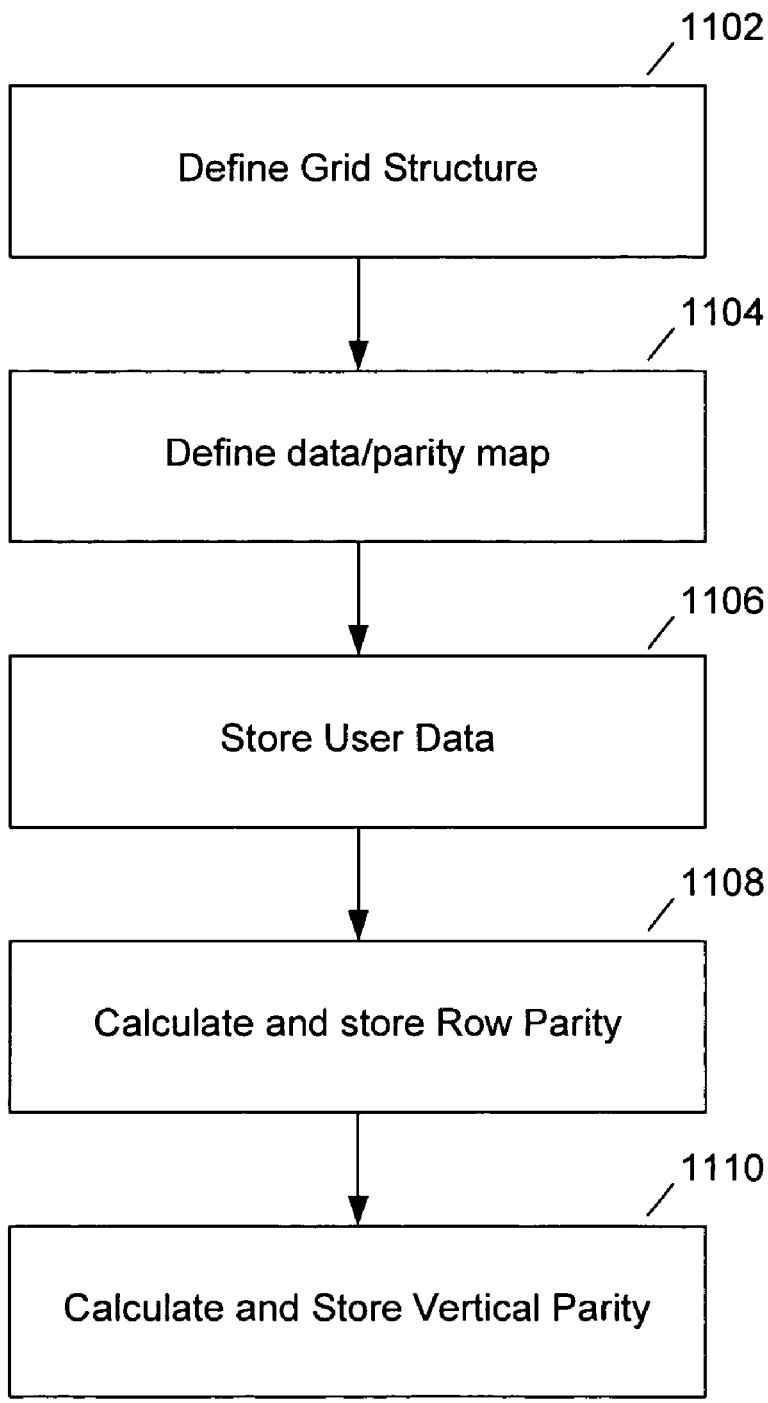

US 7,406,621 B2

DUAL REDUNDANT DATA STORAGE FORMAT AND METHOD

RELATED APPLICATION

This application claims priority to U.S. Provisional Application No. 60/559,395 filed Apr. 2, 2004.

BACKGROUND OF THE INVENTION a. Field of the Invention

The present invention pertains generally to data storage and more specifically to a data storage format and method that preserves data integrity in the event of failure of two storage domains.

b. Description of the Background

Data storage systems can comprise an array of disc drives connected to one or more disc array controllers using one or more buses. Disc array controllers may be connected to one or more host systems using one or more buses. Data storage formats, such as RAID (Redundant Array of Independent Discs), may be employed to distribute user data and redundant information across multiple drives such that if a drive fails, user data may be copied, regenerated, or reconstructed (regenerated and copied to another drive) from remaining operating drives.

RAID levels include RAID-0, RAID-1, RAID-5 and RAID-6. RAID-0 provides no data redundancy. RAID-1 provides mirrored copies of stored data. RAID-5 employs a parity data block calculated from a plurality of data blocks. RAID-6 employs two-level parity such that data may be reconstructed in the event of two drive failures.

Each of the RAID levels exhibit various tradeoffs in terms of the amount of disc space employed to store data and the rate at which data may be written and read. RAID levels such as RAID-5 and RAID-6 may employ read-modify-write operations to write data that occupies less than the number of data blocks comprising the group of data block employed to calculate parity.

The organization of data within a storage array relative to each RAID level also affects read and write performance. Various data organizations may exhibit different data densities (amount of disc space utilized to store a data set) and may exhibit different read and write performance. Further, system performance may be affected by the number and complexity of calculations performed to read, write, or recover data.

SUMMARY OF THE INVENTION

Embodiments of the present invention provide formats and methods of storing data in a data storage system employing a grid addressing method providing improved performance for read, write and regeneration operations while retaining data integrity in the event of failure of two storage domains. Data blocks within a data storage grid are specified as containing portions of user data, row parity, or vertical parity.

Embodiments of the present invention therefore can comprise: a RAID-6 data storage architecture comprising: a data storage grid comprising at least eight columns and at least twelve rows where columns correspond to storage domains and rows correspond to equal size data storage blocks in each domain; and a data/parity map designating at least sixty four contiguous blocks in the grid as user data blocks and designating at least sixteen other contiguous data blocks in the grid as row parity and designating at least sixteen other contiguous data blocks in the grid as vertical parity.

Embodiments of the present invention can further comprise: a data storage architecture providing conversion from RAID-6 to RAID-5 and RAID-0 formats without moving data, said architecture comprising: a grid comprising at least eight columns and at least twelve rows where columns correspond to storage domains and rows correspond to equal size data storage blocks in each domain; and a plurality of data/parity maps each supporting one data storage format with each map designating at least sixty four contiguous blocks in the grid as containing user data and designating at least sixteen contiguous data blocks in the grid as containing row parity data if the storage format is RAID-5 or RAID-6 and designating at least sixteen contiguous data blocks in the grid as containing vertical parity if the data storage format is RAID-6 wherein the sixty four contiguous blocks are in the same location in each grid for each data storage format.

Embodiments of the present invention can further comprise: a data storage system comprising: a host system; a storage controller; at least eight data storage devices; first computer program code defining a data storage grid in the at least eight data storage devices comprising at least eight columns and at least twelve rows where columns correspond to storage domains and rows correspond to equal size data storage blocks in each domain; and second computer program code comprising a data/parity map designating at least sixty four contiguous blocks in the grid as user data blocks and designating at least sixteen other contiguous data blocks in the grid as row parity blocks and designating at least sixteen other contiguous data blocks in the grid as vertical parity blocks.

BRIEF DESCRIPTION OF THE DRAWINGS

In the drawings,

FIG. 1 depicts an operating environment in which embodiments of the present invention may be implemented and used.

FIG. 2 depicts a data storage grid.

FIG. 3 depicts mapping of data sets in an eight domain, twelve row RAID-6 grid.

FIG. 4 depicts a RAID-6 Data/Parity Map.

FIG. 6 illustrates calculations performed to reconstruct data from failed drives.

FIG. 7 depicts how the order of calculations performed to regenerate data from blocks in failed domains can be determined FIG. 8 depicts a chart showing the order calculations performed to regenerate blocks from failed domains.

FIG. 10 depicts grid utilization maps for a plurality of RAID levels.

FIG. 11 depicts steps to define and use a RAID-6 grid.

DETAILED DESCRIPTION OF THE INVENTION

Figure 5:
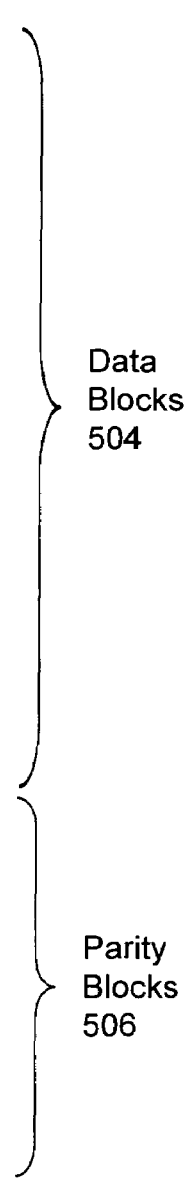
FIG. 5 illustrates how RAID-6 data may be reconstructed following the simultaneous failure of two drives.

Embodiments of the present invention employ predefined locations to store portions of user data, row parity, and vertical parity within a data grid. The organization of data and parities within the grid provides high read and write performance and reduced calculation complexity for regenerating user data in the event of two storage domain failures.

FIG. 1 depicts an operating environment in which embodiments of the present invention may be implemented and used. Operating environment 100 comprises one or more hosts 102 coupled to one or more storage controllers 104 that provide access to a plurality of data storage devices 106. A plurality of arrays of data storage devices may be employed. Data storage devices may comprise disc drives, optical memories, semiconductor memories, or any other devices that store data. Computer program code operating in one or more host systems, storage controllers, interface controllers (not depicted) and/or data storage devices serves to implement the data structure system and method of embodiments of the present invention. Each data storage device may be considered a failure domain and, as shall be described in detail in following examples, embodiments of the present invention provide efficient redundant data storage architectures that allow data retention in the event of one or more storage device failures. Embodiments of the present invention employ a data storage grid architecture mapped across a plurality of data storage devices.

A data grid comprises a plurality of consecutive data blocks in a plurality of storage domains. A first data block of each plurality of data blocks for each of the storage domains is typically at the same address (called a grid base address), simplifying address generation, however, differing base addresses for two or more storage domains can be employed. The grid provides a predefined amount of user data storage space. The amount of user data storage space in a grid may be allocated to one logical unit and grids may be virtually mapped, simplifying metadata overhead.

FIG. 2 depicts a data storage grid. The data storage grid may be viewed as a two dimensional array of equal sized data blocks. Columns in the array correspond to disc drives and rows correspond to data blocks starting at the same logical block address in each drive. In FIG. 2, data storage sheet 200 comprises a plurality of rows 222 that intersect drives 202, 204, 206, 208, 210, 212, 214, 216, 218, 220 with a data block defined at each intersection. For example, data block 224 is defined at the intersection of row 1 and drive 210. Data blocks in a grid are of equal size (storage capacity) but are not limited to a particular size. The size of a data block may be specified when configuring a storage system and may reflect the size (storage capacity) of drives in the system, user applications, controller hardware and software, and other factors. Rows 222 are contiguous in that there is no undefined storage space between rows of the grid. The starting address of the first row in the grid serves as the base address for the grid and grids may be defined such that the base address is aligned to an address that is a multiple of the size of a data storage block multiplied by the number of rows in a grid. Grids may be numbered and the storage capacity contained in a grid may be allocated using a pointer to the grid. A pointer table may associate a pointer with a grid number, providing easy virtualization and reducing metadata overhead. Pluralities of grids may be defined that occupy a portion of the available storage capacity of the drives in the array. Drives or data blocks of grids may be designated as spare, providing additional storage capacity that may be employed to contain reconstructed or copied data in the event of failure of other drives in the system. The amount of spare data blocks may correspond to the capacity of one or more drives. The data storage space in a grid excluding spare data blocks is termed a capacity grid.

FIG. 3 depicts mapping of data sets in an eight domain, twelve row RAID-6 grid. RAID-6 Grid Utilization Map 300 depicts which rows of the capacity grid contain user data and which rows contain parity information. Data sets A-P, each comprising four data blocks, are stored in the first eight rows of the capacity grid. The last four rows of the grid contain row and vertical parity data. As may be observed from map 300, data sets are stored in a sequential manner, providing excellent read performance. The method of placing user data in a first portion of a capacity grid and parity in a second portion of a capacity grid is termed packed parity. While some RAID-6 implementations employ six data rows and two parity rows, embodiments of the present invention provide performance advantages as shall be described in greater detail in following figures.

FIG. 4 depicts a RAID-6 Data/Parity Map. Data/Parity Map 400 depicts data blocks employed to calculate parity values. Map 400 comprises data rows 402 and parity rows 404. Data set "A" from FIG. 3 may be stored in locations corresponding to A-1, A-2, A-3, and A-4 and data set "B" from FIG. 3 may be stored in locations corresponding to E-5, E-6, E-7 and E-8 in FIG. 4. The letter-number pairs shown in the first eight rows of data/parity map 400 define the row and vertical parity sets for which each data block is employed. The letter of each letter-number pair is the row parity index and defines the blocks employed to calculate a row parity value. For example, blocks A-1, A-2, A-3, and A-4 are employed to calculate row party A, designated as AP. Similarly, blocks E-5, E-6, E-7, and E-8 are employed to calculate row parity E, shown as EP. As noted relative to FIG. 3, parity values calculated from data sets in a first group of domains are stored in a second group of domains. For example, data sets from group 1 have parity stored in group 2 and data sets from group 2 have parity stored in group 1. The number in each letter-number pair is the vertical parity index and defines blocks employed to calculate vertical parities. For example, blocks A-1, B-1, C-1, and D-1 are employed to calculate vertical parity 1, shown as 1P. Blocks employed to calculate vertical parities may reside in both groups of the grid. For example, blocks A-3, B-3, G-3, and H-3 are employed to calculate 3P. As may be observed from FIG. 4, parity values are stored in different domains (columns) of the capacity grid than blocks employed to calculate parity. Grid contents 406 depict a simplified description of grid contents. The data/parity organizations of embodiments of the present invention allow regeneration of data in the event of two simultaneous domain failures.

FIGS. 5 illustrates how RAID-6 data may be reconstructed following the simultaneous failure of two drives. FIG. 5 depicts a Data/Parity Map indicating failed drives. Data/Parity Map 500 is like that shown in FIG. 4 but includes arrows indicating failed drives 502. The failed drives are both in the same group. Blocks in the left two columns comprise inaccessible blocks 508 and cannot be read from or written to. Blocks in the right six columns comprise accessible blocks 510 and can read from or written to. Cross-shaded blocks in FIG. 5 illustrate that block A-2 can be regenerated from blocks B-2, C-2, H-2, and 2P. Similarly, solid-shaded blocks illustrate that block I-10 can be regenerated from blocks J-10, K-10, P10, and 10P.

FIG. 6 illustrates calculations performed to reconstruct data from failed drives. Reconstruction Calculation Example 600 depicts steps that can be performed to reconstruct data on the failed drives 502 of FIG. 5. In FIG. 6, steps 602 produce each of the regenerated blocks 604 using calculations 606. From FIG. 5 it is observed that there are a plurality of blocks in the failed drive that are single instances of a letter in the letter-number pair, or are a single instance of a number in a letter-number pair, as exemplified by blocks A-2 and I-10. In step 1 of FIG. 6, blocks corresponding to single instances of letter or number indices in the failed drives are regenerated using the calculations shown. Once a block is regenerated, it can be used to calculate other block values. For example, block A-2 is regenerated in step 1 of FIG. 6 and then is employed to regenerate block A-1 in step 2. For each of the steps 2-9, a block regenerated in a previous step is employed to regenerate another block. Restated, the steps shown in FIG. 6 employ regenerating data sets with one data block contained on a failed drive first which then provides a regenerated data block to a data set having two data blocks on failed drives. The calculations depict XOR operations and as such the order of the operands may be altered without changing the result. Calculations may be performed in any order within each step. The order in which regeneration calculation steps are performed may be determined by analyzing the row and vertical indices of the data/parity map for blocks in the failed domains.

FIG. 7 depicts how the order of calculations performed to regenerate data from blocks in failed domains can be determined. FIG. 7 depicts a regeneration chart. Chart 700 comprises data/parity map 702, row indices 704, row index instances 706, vertical indices 708, and vertical index instances 710. Data parity map 702 is an abbreviated form of the data/parity map shown in FIG. 6 and depicts blocks contained on failed drives. Row index instances 706 depicts the number of times each row index appears in map 702 for inaccessible blocks. Similarly, vertical index instance 710 depicts the number of times each vertical index appears in map 702 for inaccessible blocks. Data for blocks that have row or vertical indices that appear once in map 702 are regenerated from blocks in accessible domains in the capacity grid. From chart 700 it is observed that row indices E, G, M and O appear only once in map 702, and that vertical indices 2 and 5 also appear only once in map 702. These indices and corresponding blocks in map 702 are shaded; indicating that regeneration for these blocks is performed first. Once blocks are regenerated, the count of row and vertical indices instances is updated and single instances are again identified.

FIG. 8 depicts a chart showing the order calculations are performed to regenerate blocks from failed domains. Chart 800 includes row indices 802, row index instances 808, vertical indices 804, vertical index instances 810, and regeneration steps 806. Regeneration steps 806 include a $0^{th}$ step to show indices instances prior to performing regeneration steps. Each column depicts the number of instances (occurrences) of each index after the step (as shown in FIG. 6) is performed. As may be observed from chart 800, at least one index having a single occurrence exists after each step until step 9 is performed, indicating that all steps are completed. Charts, algorithms, or other methods may be employed to determine regeneration calculations and order of execution for each pair of failed domains. Data tables, other data structures, or executable code may be employed to provide calculations and/or order of execution.

Figure 9:
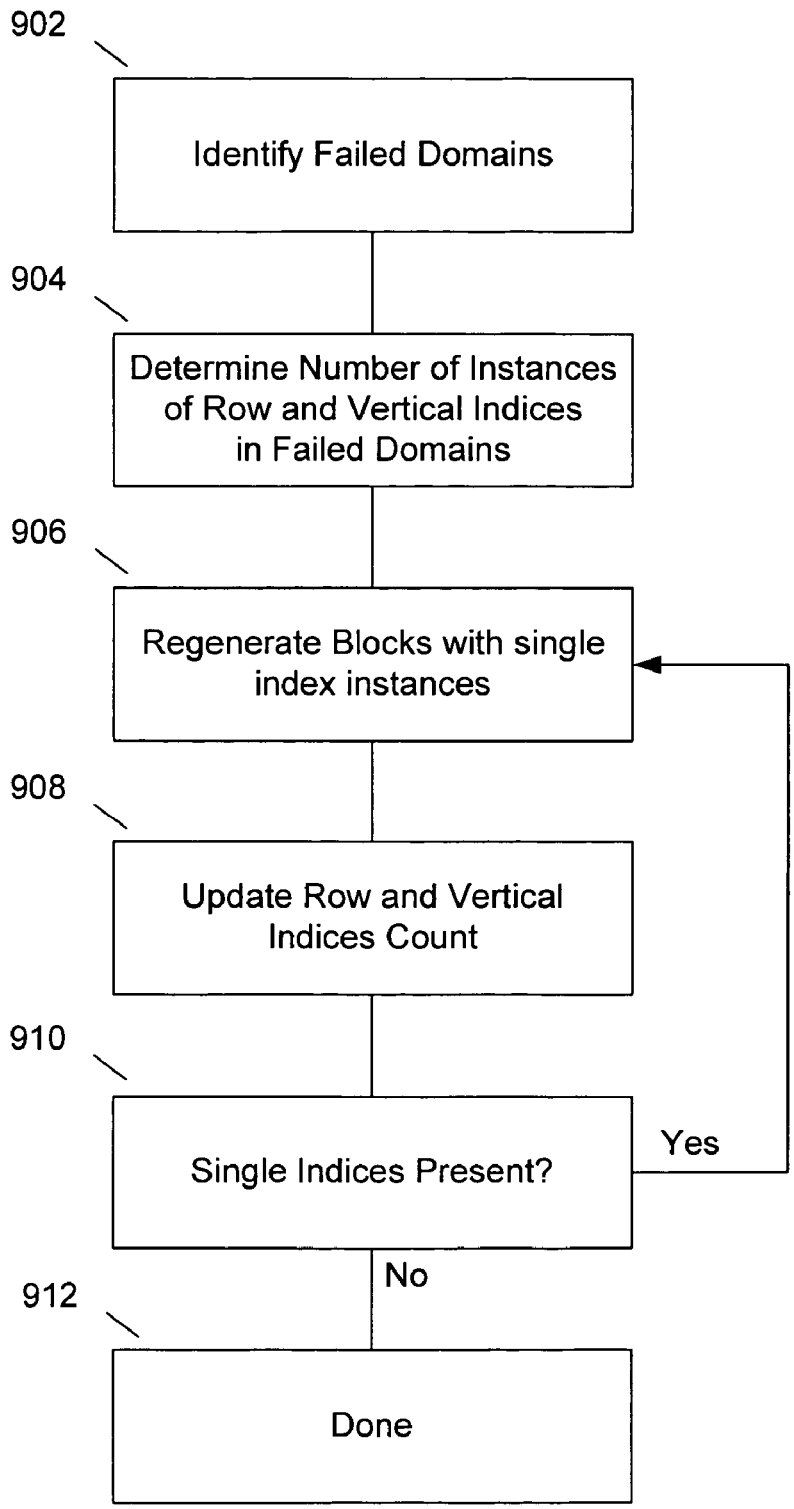
FIG. 9 depicts steps employed to regenerate RAID-6 data blocks.

FIG. 9 depicts steps employed to regenerate RAID-6 data blocks. At step 902, failed domains are identified. At step 904 the number of instances of row and vertical indices for blocks in failed domains is determined. At step 906, a block having single index instances is regenerated. At step 908 the row and vertical count of instances are updated to reflect the regenerated block. At step 910 a check is performed to determine if instances of single indices exist. If no instances of single indices exist, the process finishes at step 912. If step 910 determines that instances of single indices exist, processing continues at step 906. Steps 906, 908, and 910 may be repeated until all blocks in failed domains are regenerated.

FIG. 10 depicts grid utilization maps for a plurality of RAID levels. Utilization chart 1000 depicts the contents of RAID-0, RAID-1, RAID-5, and RAID-6 grids. Each grid comprises 240 rows. Each entry in chart 1000 corresponds to eight rows of each grid. Data 1 in the chart refers to eight rows containing 16 data sets. As shown in FIG. 5, eight rows of data sets result in two rows of row parity values (for RAID-5 and RAID-6) and two rows of vertical parity (RAID-6). As such, row parity for Data 1, Data 2, Data 3, and Data 4 are stored in an eight-row portion of the grid labeled as RP 1-4. Similarly, vertical parity for Data 1, Data 2, Data 3 and Data 4 are stored in an eight-row portion of the grid labeled as VP 1-4. For RAID-0 (1002) each entry of the grid contains user data, labeled Data 1-30. For RAID-1-2 (1004), fifteen entries contain user data, labeled Data 1-15, and fifteen entries contain mirror data, labeled MData 1-15. The mirror data contains the same data values as Data 1-15, but employs a different group to store each data set. For RAID-1-3 (1006) ten entries contain user data labeled Data 1-10, ten entries contain mirror data, labeled Mdata 1-10, and ten entries contain rotated mirror data labeled Mdata 1'-10'. For RAID-5 (1008), twenty-four entries contain user data, labeled as Data 1-24, and six entries contain row parity. For RAID-6 (1010), twenty entries contain user data, labeled as Data 1-20, five entries contain row parity, and five rows contain vertical parity. Chart 1000 illustrates how embodiments of the present invention provide commonality of storage formats, simplifying conversion between formats. Different RAID formats may be employed depending upon utilization of the stored data. For example, files associated with transaction processing may be stored in a RAID-1 format when being updated and maybe stored in a RAID-5 or RAID-6 format after updates are completed.

FIG. 10 shows that RAID-6 grids of embodiments of the present invention can be converted to RAID-0 or RAID-5 formats without moving data. To convert a RAID-6 grid to RAID-5, the designation of the grid is changed to RAID-5 and VP1-20 are designated as free entries. Similarly, a RAID-6 grid may be converted to RAID-0 by changing the grid designation to RAID-0 and designating VP1-20 and RP1-20 as free entries.

FIG. 11 depicts steps to define and use a RAID-6 grid. At step 1102, a grid comprising at least eight domains and at least sixteen rows is defined. The grid may be a subset of a parent grid such that spare data blocks exist in each row of the parent grid. At step 1104 a data parity map is defined. The data parity map designates at least sixty-four contiguous data blocks in the grid as user data blocks. The blocks are arranged as a plurality of row sets and a plurality of vertical sets each containing four user data blocks such that each user data block is a member of one row set and is a member of one vertical set. The data/parity map also designates at least sixteen other contiguous data blocks as row parity blocks that can contain a row parity value for each row set and associates each row parity block with one row set. The data/parity map also designates at least sixteen other contiguous data blocks as vertical parity blocks and associates each vertical parity block with one vertical set. Blocks are designated such that no domain in the grid contains both a user data block and a row parity value or vertical parity value for the row set or vertical set of the user data block. At step 1106 user data is written to at least one user data block. At step 1108 a row parity value is calculated for the row set containing the at least one user data block, by XORing the four user data blocks comprising the row set, and the parity value is stored in the associated row parity block. This may employ reading other user data blocks from the grid or reading a previous row parity value for the set and XORing the previous row parity value with the user data. At step 1110 a vertical parity value is calculated for the vertical set containing the at least one user data block, by XORing the four user data blocks comprising the vertical set, and the parity value is stored in the associated vertical parity block. This may employ reading other user data blocks from the grid or reading a previous row parity value for the set and XORing the previous row parity value with the user data.

Embodiments of the present invention may employ computer program code operating in a host system, interface controller, disc controller and/or other processor based system components. Computer program code of embodiments of the present invention may be distributed among a plurality of components. For example, a host system may contain computer program code managing allocation of grids and a disc controller may contain computer program code that regenerates data form inaccessible blocks.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method comprising:
    defining a grid structure of columns and rows, where said columns each correspond to a storage domain and said rows correspond to a plurality of blocks from the domains;
    designating a contiguous first plurality of the data blocks in said grid as user data blocks arranged in a first plurality of adjacent rows of the grid;
    designating a contiguous second plurality of the data blocks in said grid as parity blocks arranged in a second plurality of adjacent rows of the grid; and
    converting the grid from a first RAID format to a second RAID format by redesignating selected parity blocks as free entries.

2. The method of claim 1 wherein the designating a contiguous second plurality of data blocks step comprises designating a portion of the second plurality as row parity blocks and another portion of the second plurality as vertical parity blocks.

3. The method of claim 2 wherein the designating a contiguous first plurality of data blocks step comprises designating the first plurality into row sets and vertical sets.

4. The method of claim 3 further comprising designating said user data blocks, said row parity blocks and said vertical parity blocks such that no row parity block is in the same domain as a user data block of the associated row set and such that no vertical parity block is in the same domain as a user data block of the associated vertical set.

5. A data storage architecture comprising:
    a data storage grid comprising columns associated with storage domains and rows associated with equal size data storage blocks of the storage domains; and
    a data/parity map designating a contiguous grouping of the data storage blocks as user data blocks in the grid and designating a different contiguous grouping of the data storage blocks as parity blocks in said grid, wherein the user data blocks are further arranged to support a plurality of different RAID levels without movement of said blocks by respectively allocating or returning as free entries selected ones of the parity blocks.

6. The data storage architecture of claim 5 wherein said data/parity map arranges said user data blocks into a plurality of row sets and a plurality of vertical sets.

7. The data storage architecture of claim 6 wherein said data/parity map uniquely associates a row parity block with one row set of said plurality of row sets and uniquely associates a vertical parity block with one vertical set of said plurality of vertical sets.

8. The data storage architecture of claim 7 wherein said data/parity map arranges said user data blocks, row parity blocks, and vertical parity blocks such that no domain containing a first user data block contains a row parity block for a row set containing said first user data block or contains a vertical parity block for a vertical set containing said first user data block.

9. A data storage architecture comprising:
    a grid comprising columns and rows corresponding to storage domains and to equal size data storage blocks, respectively; and
    means for converting the grid from a RAID 6 format to a lower RAID format without moving data in the grid by redesignating parity blocks in the grid as free entries.

10. The data storage architecture of claim 9 wherein the means for converting further operates to convert the grid from said lower RAID format to said RAID 6 format without moving data in the grid by allocating said free entries as parity blocks.

11. The data storage architecture of claim 9 wherein the means for converting is characterized by converting the grid from a RAID 6 format to a RAID 5 format.

12. The data storage architecture of claim 9 wherein the means for converting is characterized by converting the grid from a RAID 6 format to a RAID 0 format.

13. A data storage system comprising an array of data storage devices and a data storage grid in memory which arranges the storage devices into columns and data storage blocks of said storage devices into rows, wherein the storage grid designates a first contiguous grouping of the data storage blocks as user data blocks and a second contiguous grouping of the data storage blocks as parity blocks with each storage device storing at least one said user data block and at least one said parity block, and wherein the data storage blocks are arranged to support a plurality of different RAID formats without movement of said user data by selectively allocating or returning selected parity blocks as free entries.

14. The data storage system of claim 13 wherein the grid comprises both row parity data and vertical parity data in the second contiguous grouping of the data storage blocks.

15. The data storage system of claim 14 further comprising executable instructions for mapping the array in accordance with a selected one of a plurality of different RAID formats.

16. The data storage system of claim 15 further comprising executable instructions for mapping the array from a RAID 6 format to a lower RAID format without moving the stored user data.

* * * * *